United States Patent [19]

Roberts et al.

[11] Patent Number: 4,516,059
[45] Date of Patent: May 7, 1985

[54] MOTOR CONTROL CHOPPER APPARATUS PHASE ANGLE LIMITING

[75] Inventors: Richard D. Roberts, South Park Township, Allegheny County; James H. Franz, Jr., Murrysville; Lester J. Hoffman, Churchill Borough; Lalan G. Miller, Forest Hills, all of Pa.

[73] Assignee: Westinghouse Electric Corp., Pittsburgh, Pa.

[21] Appl. No.: 265,019

[22] Filed: May 19, 1981

[51] Int. Cl.³ .......................................... H02K 27/20
[52] U.S. Cl. ................................ 318/301; 318/341; 318/345 C; 318/345 R
[58] Field of Search ............... 318/139, 341, 376, 246, 318/373, 434, 301, 345 C, 345 R; 246/182 B

[56] References Cited

U.S. PATENT DOCUMENTS

| | | | |
|---|---|---|---|
| 3,716,767 | 2/1973 | Kuriyama et al. | 318/139 |
| 3,818,291 | 6/1974 | Miyake | 318/139 |
| 3,836,833 | 9/1974 | Harris et al. | 318/270 |
| 3,903,465 | 9/1975 | Ibamoto et al. | 318/341 |
| 3,906,317 | 9/1975 | Narita | 318/246 |
| 3,974,992 | 8/1976 | Matty | 246/182 B |
| 3,989,990 | 11/1976 | Thompson | 318/139 |
| 4,011,492 | 3/1977 | Murphy et al. | 318/373 |
| 4,037,145 | 7/1977 | Bailey et al. | 318/341 |
| 4,066,934 | 1/1978 | Waldorf et al. | 318/139 |
| 4,066,936 | 1/1978 | Hirota | 318/139 |
| 4,084,119 | 4/1978 | Kato et al. | 318/434 |
| 4,090,115 | 5/1978 | Franz, Jr. | 318/341 |
| 4,095,153 | 6/1978 | Matty et al. | 318/376 |
| 4,150,324 | 4/1979 | Naito | 318/139 |
| 4,199,711 | 4/1980 | Horiuchi et al. | 318/139 |
| 4,201,936 | 5/1980 | Roumanis | 318/341 |
| 4,207,478 | 6/1980 | Marumoto et al. | 318/341 X |
| 4,211,965 | 7/1980 | Toyama et al. | 318/341 |
| 4,217,527 | 8/1980 | Bourke et al. | 318/139 |

Primary Examiner—Ulysses Weldon
Attorney, Agent, or Firm—R. G. Brodahl

[57] ABSTRACT

A programmed microprocessor motor control apparatus is provided for a vehicle propulsion motor that is responsive to an input control device to determine the acceleration rate and a predetermined motor voltage curve of the propulsion motor.

7 Claims, 11 Drawing Figures

MOTOR CONTROL CHOPPER APPARATUS PHASE ANGLE LIMITING

CROSS-REFERENCE TO RELATED APPLICATION

The present application is related to the following patent application Ser. No. 902,001 which was filed Apr. 27, 1978 by T. C. Matty and entitled "Transit Vehicle Motor Effort Control Apparatus and Method", now issued as U.S. Pat. No. 4,282,468 which is assigned to the same assignee and the disclosure of which is incorporated herein by reference.

BACKGROUND OF THE INVENTION

It is known in the prior art to provide a power control pedal and a brake control pedal for the operator of a trolley vehicle, such that the operator can determine the acceleration rate of the vehicle by selecting the amount of movement that he provides to the power pedal. The propulsion motor control responds to this movement of the power pedal to provide a vehicle acceleration rate in accordance with a constant current. For example, this constant current can correspond with an acceleration rate of three miles per hour per second, and the motor current remains at that constant current as the vehicle speed increases until the motor curve is reached. Then the motor current decreases as the motor speed increases in accordance with the motor curve up to some maximum motor speed where there is a balance provided between the train movement resistance and the output speed of the propulsion motors. The operator controlled position of the power pedal establishes the acceleration rate of the vehicle before the motor curve is reached.

The required tractive effort to accelerate the vehicle is determined in relation to the vehicle weight, the number of propulsion motors per vehicle, and the effective train resistance, and then a desired value of motor current is established in relation to this required tractive effort. The well-known motor curve relationship is utilized to determine how long will be required for the vehicle to reach a desired speed in relation to a given value of motor current.

It is known in the prior art as taught by U.S. Pat. No. 4,095,153 to provide a chopper control apparatus for a propulsion motor, which apparatus has a phase angle controller that builds up the actual motor current in response to a requested value of motor current by adjusting the ON/OFF duty cycle of the chopper as necessary to maintain this requested current. As the motor speed increases, this requires move average motor volts and the chopper phase angle is increased to reach the value of motor current and to maintain that value of motor current when the chopper is full ON. The chopper then provides full line voltage across the motor when full ON, with the current falling off as the motor operation follows the motor curve up to the maximum vehicle speed where the provided tractive effort balances the train movement resistance for the particular vehicle load.

The operator power pedal position provides a rate request which translates into required tractive effort and requested motor current. The chopper apparatus phase angle provides that requested motor current until the chopper is full ON and then the current decreases as the motor operation follows the motor curve for the propulsion motor.

SUMMARY OF THE INVENTION

A chopper apparatus control is provided for a vehicle propulsion motor system, which provides a desired vehicle acceleration rate and a predetermined limit on the phase angle of the chopper apparatus to determine the maximum speed of the vehicle motor as established by the input effort request to determine the operation of the vehicle.

DESCRIPTION OF THE PREFERRED EMBODIMENT

Figure 1:
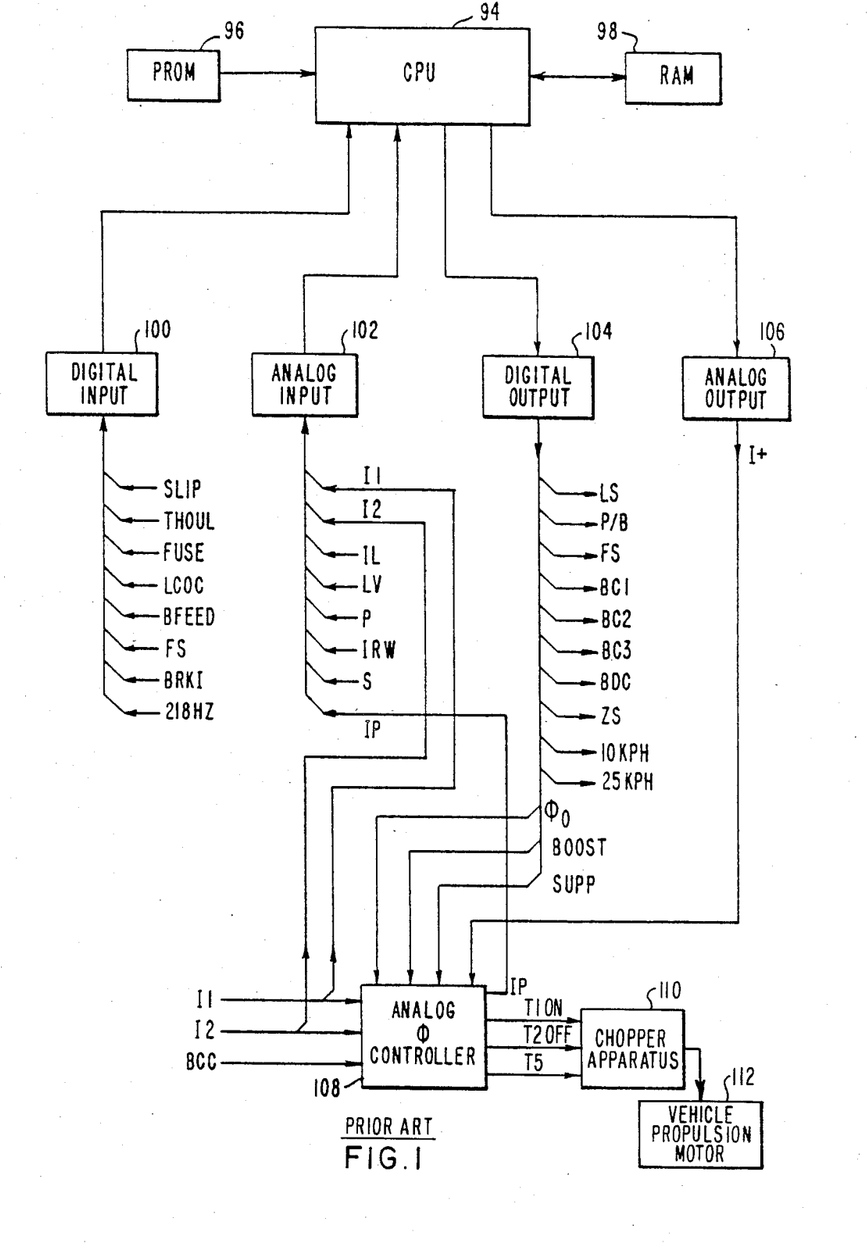
FIG. 1 shows a prior art vehicle propulsion motor control apparatus.

In FIG. 1 there is shown a functional illustration of a prior art chopper control apparatus for vehicle propulsion motors and as disclosed in greater detail in U.S. Pat. No. 4,095,153, the disclosure of which is incorporated herein by reference. The provided and well known input signals and output signals operative with that chopper control apparatus are shown with the chopper control apparatus including a motor control microprocessor or CPU 94 operative with the PROM programmable memory 96 and a scratchpad RAM random access memory 98 used for intermediate storage. The application program in accordance with the program listing including in the Appendix of that patent is stored in the programmable memory 96. The microprocessor 94 can be an INTEL 8080. The random access memory 98 can be an INTEL 8108 and the programmable memory 96 can be an INTEL 1702 programmable read-only memory, which items are currently available in the open marketplace.

The vehicle operator provides a P signal request to the P signal generator which outputs a P signal which selects a desired propulsion effort and this signal goes from zero to 100 milliamps to establish how much propulsion power or braking effort is desired by a particular vehicle. The P signal is decoded to determine the proper motor current to generate the requested effort. A failsafe reading of the P signal level is made such that should the P signal be lost, the train control automatically goes into a brake mode.

Figure 2:
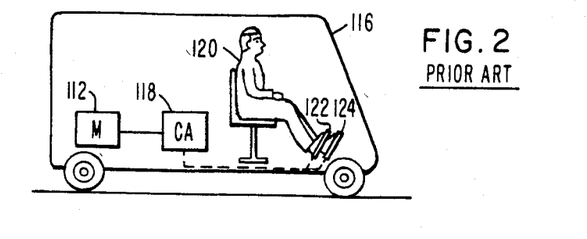
FIG. 2 schematically shows a prior art vehicle with an operator.

In FIG. 2 there is shown a prior art trolley vehicle 116 including a motor 112, a motor control apparatus 118, a human operator 120, and a vehicle control power pedal 122 and brake pedal 124.

Figure 3:
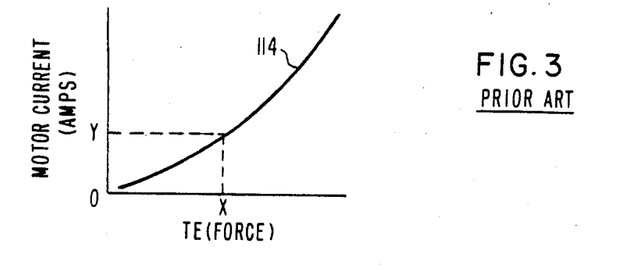
FIG. 3 shows a prior art curve to illustrate the well-known relationship between the desired tractive effort and required motor current for a typical series DC propulsion motor.

In FIG. 3 there is shown a prior art curve to illustrate the well-known relationship between desired tractive effort and the required motor current to provide tractive effort for a typical trolley vehicle having a series DC propulsion motor. When the operator 120 moves the control power pedal 122 a given amount to determine the P signal effort request, this establishes the desired tractive effort X. The analog phase controller 108 shown in FIG. 1 operates to control the output average voltage from the chopper apparatus 110 to determine the average motor current Y in accordance with the tractive effort curve 114 shown in FIG. 3. The curve 114 is established for each vehicle 116 in accordance with the weight and passenger loading of the vehicle and the operating characteristics of the propulsion motors 112 as determined by the control apparatus 118.

Figure 4:
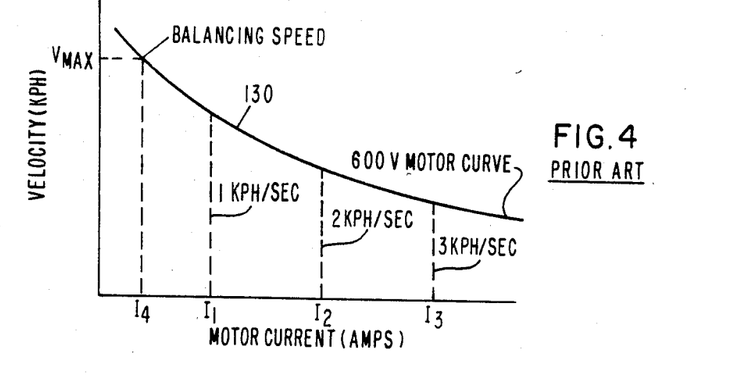
FIG. 4 shows a prior art curve to illustrate the well-known motor curve relationship between motor current and motor speed.

In FIG. 4 there is shown a prior art curve to illustrate the well-known relationship between motor current and motor speed in kilometers per hour for a DC series motor of the type employed for trolley vehicle propulsion. The position of the power pedal 122 determines the motor current I in relation to desired acceleration rate. For example, the current I1 shown in FIG. 4 might provide an acceleration rate of one kilometer per hour per second, the current I2 might provide an acceleration rate of two kilometers per hour per second, and the current I3 might provide an acceleration rate of three kilometers per hour per second. Once the motor speed increases up to the motor curve 130, the motor speed then follows up the motor curve 130 until a maximum or balance speed $V_{max}$ is reached where the provided tractive effort balances the effective vehicle movement resistance and with a motor current I4 resulting at that maximum speed.

Figure 5:
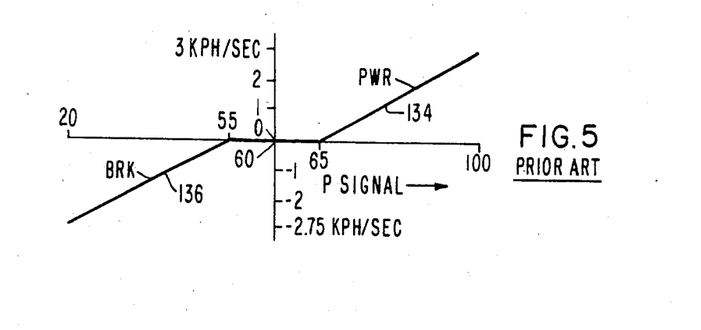
FIG. 5 shows a curve illustrating the provided tractive effort request P signal in relation to the resulting acceleration rate of the vehicle.

In FIG. 5 there is shown the prior art provided relationship of the acceleration rate as a function of P signal effort request. The power pedal 122 includes a potentiometer device which provides the P signal from 60 to 100 milliamps which is illustrated by the curve 134. From 60 to 65 milliamps, a deadband control operation is provided for control stability where the phase controller 108 does not change its output in response to the P signal. From 65 milliamps to 100 milliamps, the magnitude of the P signal establishes a current request I+ to the phase controller to provide a power mode motor acceleration rate from 0 to 3 kilometers per hour per second as shown by curve 134 in FIG. 5. The brake pedal 124 includes a potentiometer device which provides a P signal from 20 to 60 milliamps which is illustrated by the curve 136. From 20 to 55 milliamps, the magnitude of the P signal establishes a current request I+ to the phase controller to provide a brake mode motor deceleration rate from minus 2.75 to 0 kilometers per hour per second as shown in FIG. 5 by the curve 136. From 55 to 60 milliamps, a deadband control operation is provided for control stability where the phase controller 108 does not change its output in response to the P signal.

Figure 6:
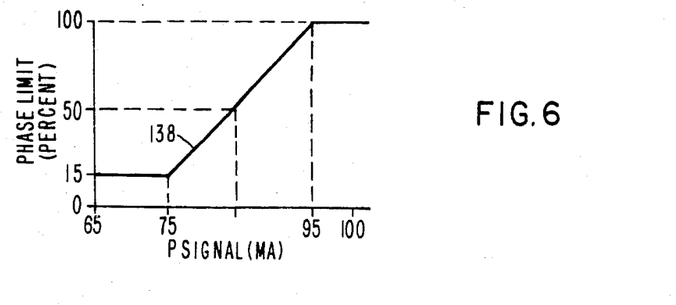
FIG. 6 shows a curve illustrating the desired phase angle limit in relation to the provided tractive effort request P signal in accordance with the present invention.

In FIG. 6 there is shown a curve 138 illustrating the phase angle limit established for the phase controller 108 as a function of the provided P signal in response to the position of the operator's power pedal 122 in accordance with the present invention. For a P signal from 60 to 65 milliamps, a zero phase angle limit is established. For a P signal from 65 to 75 milliamps, a 15% phase angle limit or duty cycle for the chopper apparatus 110 is established. For a P signal from 75 to about 95 milliamps, the phase angle limit changes linearly from 15% to 100% duty cycle. For a P signal from about 95 to 100 milliamps, the phase angle limit is constant at 100%.

Figure 7:
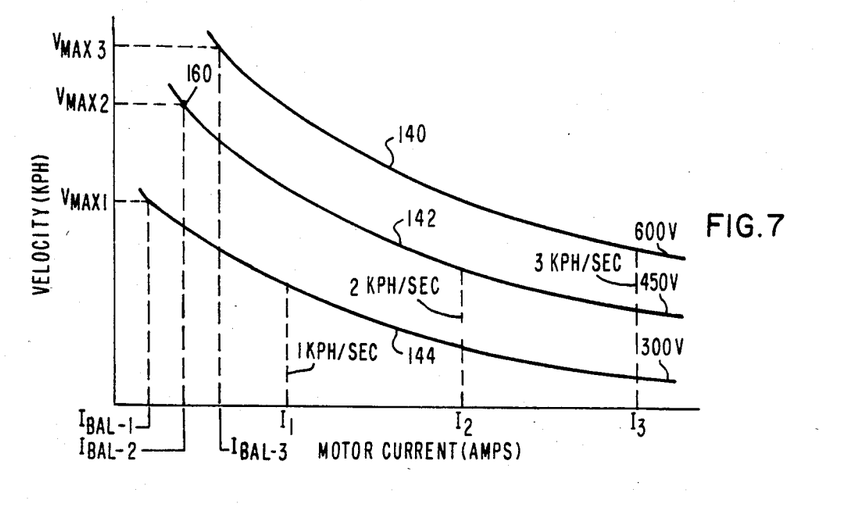
FIG. 7 shows a curve illustrating the modified control operation of the vehicle propulsion motor provided by the present invention.

In FIG. 7 there is illustrated the resulting motor control operation provided by the present invention, with the P signal determining the voltage applied across the motor as shown by the respective motor curves. The curve 140 represents full ON or 100% phase angle operation of the chopper apparatus 110 and, for example, 600 volts applied across the motor 112. The curve 142 represents a 75% phase angle limit or duty cycle operation of the chopper apparatus 110 and for example 450 volts applied across the motor 112. The curve 144 represents a 50% phase angle limit of the chopper apparatus and, for example, 300 volts applied across the motor 112. The supply line volts times the phase angle determines the motor volts in the above example.

When the vehicle motor is at zero speed, it does not require a large voltage to obtain a desired motor current. As the motor speed starts to increase, more volts are needed to maintain that motor current so the phase angle increases until a predetermined phase angle limit or a 100% phase angle is reached. The resulting voltage curve in accordance with the phase angle limit or the full ON operation of the chopper apparatus is then followed as the motor speed increases until the balance current is obtained where the tractive effort provided by the corresponding motor current balances the vehicle movement resistance.

The P signal provided by the operator's power pedal 122 determines the phase angle limit of the chopper apparatus in accordance with the relationship of FIG. 6, and that phase angle limit establishes the particular motor voltage curve which controls the actual motor operation as shown in FIG. 7.

For the example of a maximum balance speed 160 for the 75% phase angle limit curve 142, the corresponding motor current would be $I_{BAL}2$ shown in FIG. 7 to balance the movement resistance of the vehicle for that motor operation.

The motor control apparatus shown in FIG. 1, when including the application control program of the present invention and in accordance with the program listings provided in the Appendix, will respond to the P signal to determine the desired tractive effort request TER. There is included a look-up table of values in accordance with the curve 114 shown in FIG. 3 to determine the required motor current. This motor current then determines the acceleration rate in accordance with the curve 130 shown in FIG. 4 and the curve 134 shown in FIG. 5. The P signal establishes the phase angle limit if any is required as shown by curve 138 of FIG. 6. This phase angle limit operates as shown in FIG. 7 to provide a motor voltage limit for controlling the motor operation. The variable TER provided as the output of the TER subroutine shown in the Appendix can be set equal to the variable PR in the program set forth in the above cross-referenced patent application for the purpose of determining the acceleration of the propulsion motor.

Figure 8:
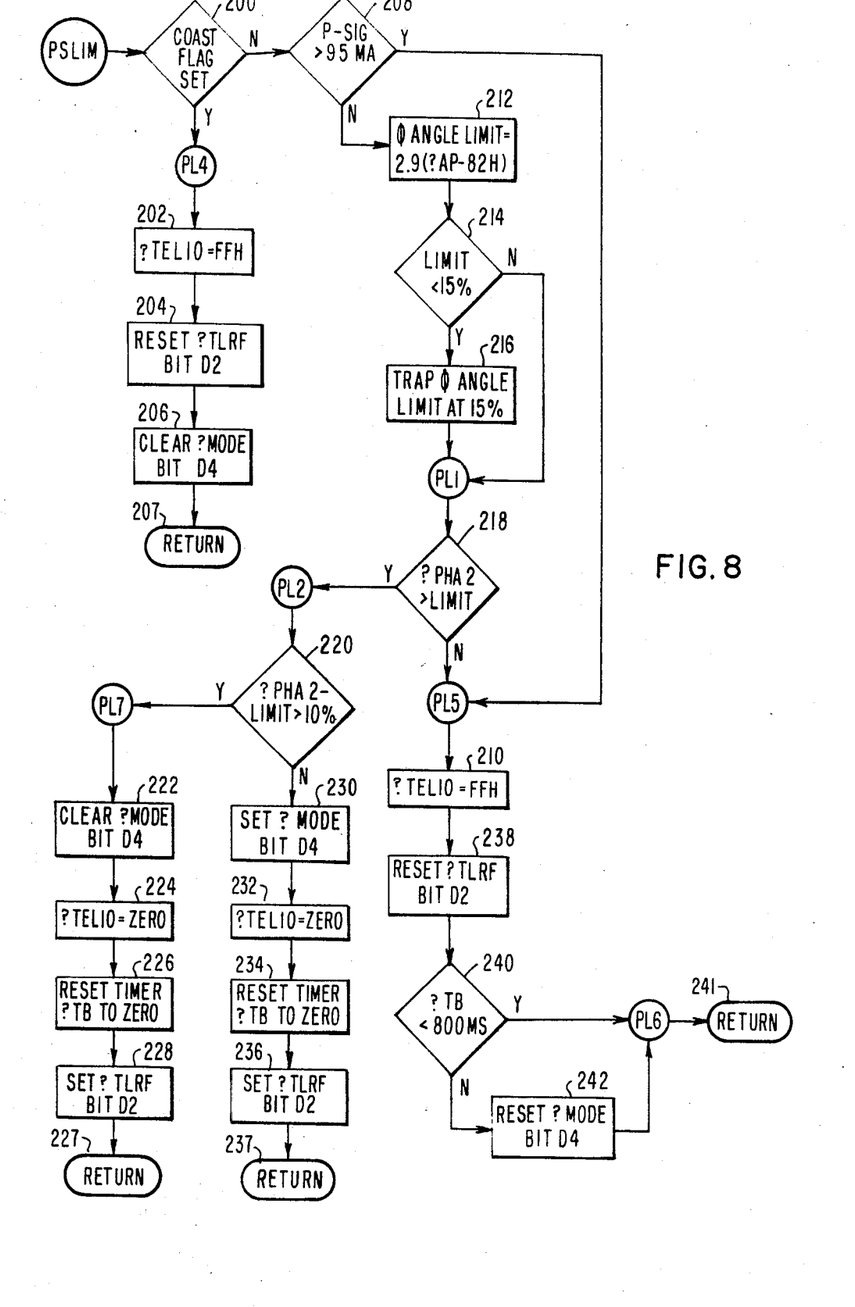
FIG. 8 shows a flow chart of the program for determining the effort request P signal limit in accordance with the present invention.

In FIG. 8, there is shown the flow chart for the PSLIM program routine to determine the tractive effort request P signal limit PSLIM and is executed once every ten milliseconds or every three operating cycles of the main propulsion control program of the CPU94 shown in FIG. 1, and this PSLIM program is only called in the power mode of operation. At step 200, a check is made to see if the vehicle is in the coast mode, and if yes, at step 202, the P signal tractive effort limit 10 is set all the way up. In practice, however, in coast operation, a low current is requested so that the actual phase angle should not go this high. Then at step 204, the flag TLRF bit D2 which indicates a tractive effort limit is in effect is reset, and at step 206 the bit D4 in the mode word is cleared which otherwise flags the provision of a slower jerk rate when a tractive effort limit is in effect to change the car response and avoid undesired oscillation. If the vehicle is not in the coast mode at step 200, at step 208 a check is made to see if the P signal is greater than 95 milliamps. If it is, go to step 210 for setting the tractive effort limit TEL10 to a maximum value, since above this value of P signal, the phase angle limit can go as high as required. Note in FIG. 6 that for a P signal above 95 milliamps, the phase angle limit can go to 100%.

At step 208, if the P signal is less than 95 milliamps, at step 212, the phase angle limit is set equal to 2.9 times the P signal value AP, which is stored in RAM 98, and minus 82 hex to subtract the 65 milliamps offset for the FIG. 5 relationship in power. At step 214, a check is made to see if the limit is less than 15%, and if so, at step 216, the phase angle limit is set to a 15% minimum as shown in FIG. 6. At step 218, the actual phase angle of the chopper is compared with the phase angle limit, and if the actual phase angle is greater than the limit, at step 220, a check is made to see if the difference between the phase angle and the limit is greater than 10% for establishing how much larger is the phase angle. For example, the operator might have changed the power pedal position from 90 milliamps P signal to 75 milliamps, and the slow jerk rate is not desired before changing the phase angle limit for the new P signal level. If this difference is greater than 10%, then at step 222 the mode bit is cleared so as not to get this slow jerk rate, the tractive limit 10 is still set to zero at step 224, a timer is reset to zero at step 226 and the flag bit in the TLRF word is set at step 228. If the difference at step 220 is less than 10%, then at step 230 the slow jerk rate mode bit is set, and at steps 232, 234 and 236 the same operations are provided as for steps 224, 226 and 228 and the tractive effort limit is in effect.

If the actual phase angle is not greater than the phase angle limit at step 218, then at step 210 the tractive effort limit 10 will be set at maximum, at step 238 the flag bit is cleared, and at step 240 the timer TB is checked to see if it has been less than 800 milliseconds since it was reset to zero. If yes, the slow jerk rate will be kept. If not, at step 242, the slow jerk rate mode bit is cleared and a return to the fast jerk rate is made.

Figure 9A:
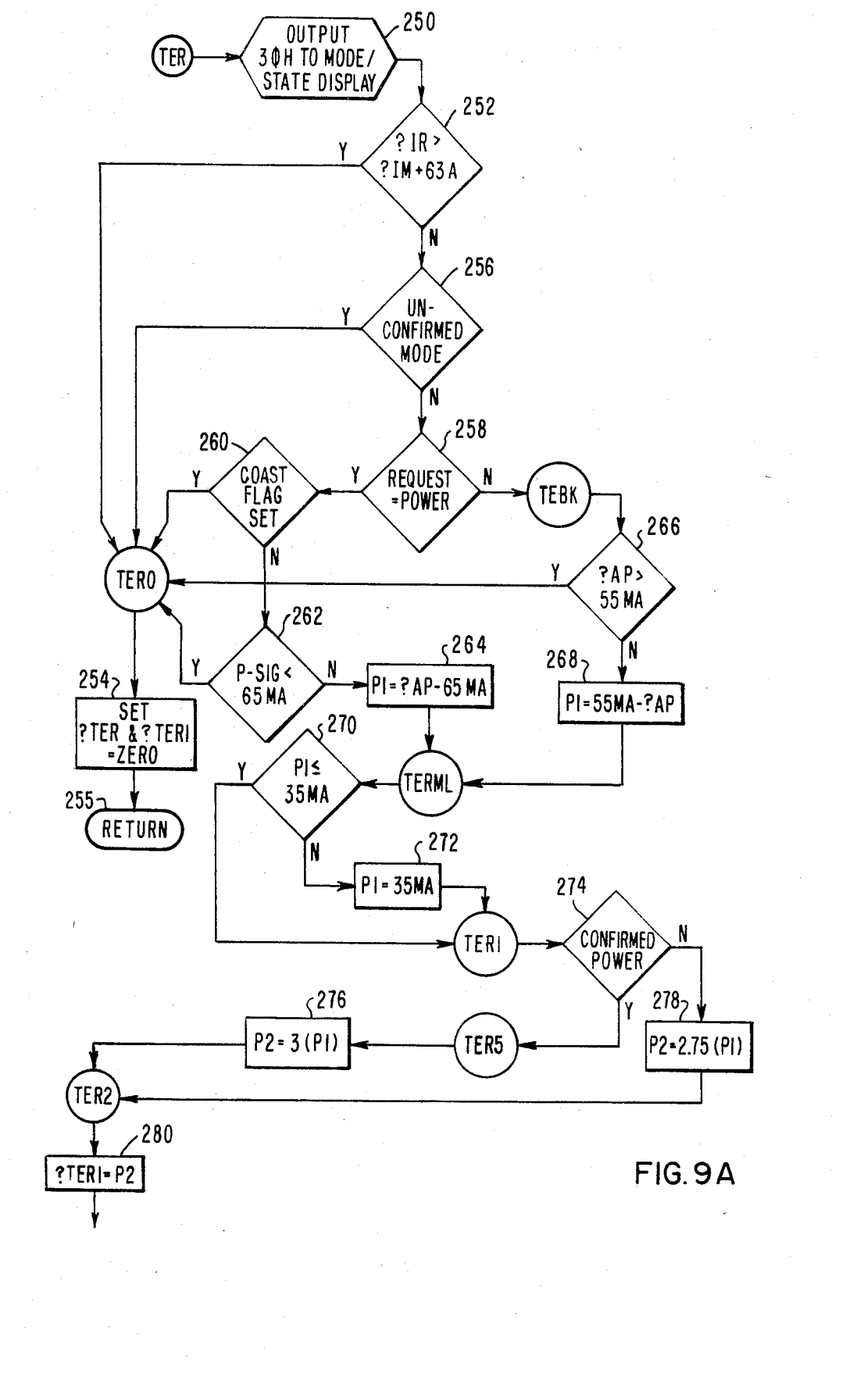
FIGS. 9A-9B show a flow chart of the program for establishing the tractive effort request TER from the P signal.
Figure 9B:
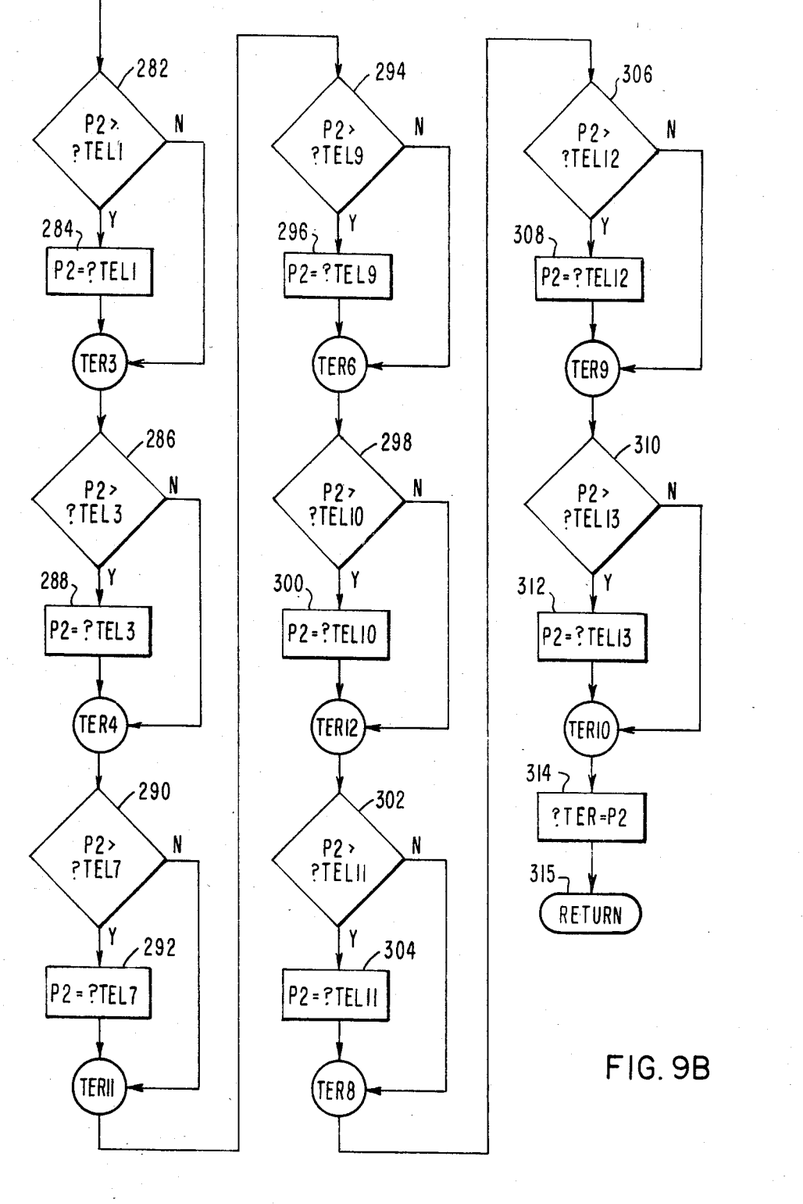

In FIG. 9, the TER routine flow chart is shown to derive a tractive effort request from the P signal. At step 250, a display output is provided. At step 252 a check is made to see if the current request is greater than actual motor current plus 63 amperes, to see if substantially more current is being asked for than is actually being obtained. If so, something might be wrong, so at step 254, the TER and TER1 are set equal to zero. If the operation appears to be okay at step 252, at step 256, a check is made to see if the mode word indicates how the motor circuit is set up, such as in brake mode, a power mode or in neither. If it is neither and unconfirmed, the program goes to TER$\phi$ and sets the indicated values to zero as before. If the motor circuit is set up, at step 258 a check is made to see if there is a request for power or a request for brake. If power is requested, at step 260, a check is made to see if the vehicle is in coast, and if so, at step 254 TER and TER1 are set to zero. If the vehicle is not coasting, at step 262, the P signal is checked to see if it is less than 65 milliamps, and if it is at step 254, TER and TER1 are set to zero. If not, at step 264, the intermediate value P1 is set equal to AP, which is the P signal stored in RAM, minus 65 milliamps. If the request was for brake at step 258, then at step 266 a check is made to see if the stored P signal AP is greater than 55 milliamps and not in the brake range. If so, go to step 254 as before. If okay, at step 268, the intermediate value P1 is set equal to 55 milliamps minus the stored P signal AP. At step 270, a check is made to see if P1 is less than or equal to 35 milliamps. If not, at step 272, P1 is set equal to 35 milliamps. In power, the P signal should be from 65 to 100 milliamps, which is a difference of 35 milliamps, and in brake the P signal should be from 20 to 55 milliamps, which is again a 35 milliamps difference. The program goes to step 274 where a check is made to see if the motor circuit is set up in power, and if so, at step 276, P2 is set equal to 3 times P1. If the motor circuit is in brake, at step 278 P2 is set equal to 2.75 times P1. In FIG. 5, there is shown in power a 3 MPH maximum acceleration rate and in brake a 2.75 MPH maximum deceleration rate. At step 280, TER1 is set equal to P2. Then limits are applied to P2, such as at step 282 if P2 is greater than TEL1, it is limited to TEL1 at step 284. At step 286, if P2 is greater than TEL3, at step 288, it is limited to TEL3. At step 290, if P2 is greater than TEL7, it is limited at step 292 to TEL7. This same checking and limiting is repeated at steps 294 and 296 for TEL9, at steps 298 and 300 for TEL10 the phase angle limit bit, at steps 302 and 204 for TEL11, at steps 306 and 308 for TEL12 and at steps 310 and 312 for TEL13. At the end of this program the tractive effort request TER is set equal to P2.

Figure 10:
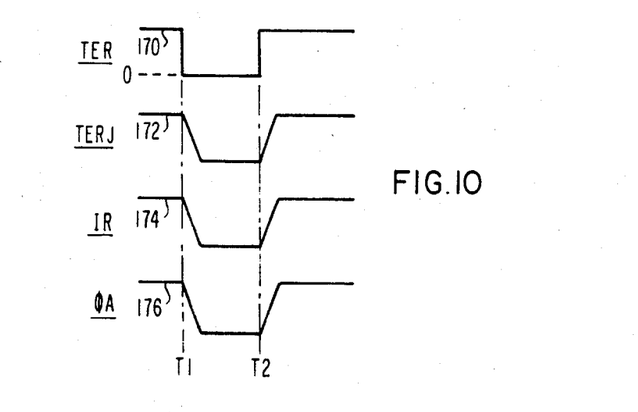
FIG. 10 shows the resulting regulation of the chopper actual phase angle for controlling the operation of the vehicle propulsion motor.

In FIG. 10, there is shown the resulting regulation of the actual phase angle $\phi$ of the chopper apparatus 110 by the here-provided control operation including the flow charts shown in FIGS. 8 and 9. The curve 170 shows the change to zero of the tractive effort request TER at time T1 when the actual phase angle is greater than the P signal determined phase angle limit, as determined at step 218 of the flow chart of FIG. 8. At step 220, if the difference between the actual phase angle and the phase angle limit is greater than 10%, then this will cause the jerk limited tractive effort request TERJ to ramp down as shown by curve 172, and the current request IR shown by curve 174 will begin to ramp down. The output phase angle $\phi$ from the phase controller 108 will similarly ramp down until the average actual phase angle over a period of several cycles becomes the same as or smaller than the provided phase angle limit $\phi_L$. When it is determined that the actual phase angle $\phi_A$ is not greater than the phase angle limit $\phi_L$ at step 218 and at time T2, the tractive effort request TER goes back to the value provided by the motor control CPU 94 in response to the P signal effort request from the operator's power pedal 122. This results in the jerk limited tractive effort request TERJ ramping back up as shown by curve 172. The current request IR also ramps back up as shown by the curve 174, and the output actual phase angle $\phi_A$ from the phase controller 108 begins to ramp back up. This operation results in the control of the output phase angle $\phi_A$ to provide the desired average value 178 of the phase angle $\phi_A$ as shown by curve 176.

The phase angle limit of 15% shown in FIG. 6 for P signals between 65 and 75 milliamps is provided to stabilize the motor control operation without objectional oscillation of the motor current such that passengers might otherwise feel such oscillation in the resulting movement of the vehicle 116.

GENERAL DESCRIPTION OF INSTRUCTION PROGRAM LISTING

In Appendix A and Appendix B, there are included instruction program listings that have been prepared to control a passenger vehicle in accordance with the here-disclosed control system and method and the respective flow charts shown in FIGS. 8 and 9. These instruction program listings are written in the assembly language of the Intel 8080 computer system. Many of these computer systems have already been supplied to customers, including customer instruction books and descriptive documentation to explain to persons skilled in this art the operation of the hardware logic and the executive software of this digital computer system.

```
03870; ####################################
03880
03890PSLIM:  LDA    ?FLG8
03900        ANI    0FFH    ;COAST FLAG SET?
03910        JNZ    PL4     ;YES
03920
03930        PUSH   B
03940        PUSH   D
03950        LDA    ?HP     ;GET P-SIGNAL
03960        CPI    0BEH    ;P-SIG > 95 MA?
03970        JNC    PL5     ;YES
03980        SUI    82H     ;MAKE 2. 875(AP-82H)
03990        JNC    UF      ;TRAP FOR UNDERFLOW
04000        XRA    A
04010UF:
RAL
04020        ANI    0FEH
04030        MOV    B,A
04040        RAR
04050        RRC
04060        ANI    7FH
04070        MOV    C,A
04080        RRC
04090        ANI    7FH
04100        MOV    D,H
04110        RCC
04120        ANI    7FH
04130        ADD    D
04140        JC     OVFL
04150        ADD    C
04160        JC     OVFL
04170        ADD    B
04180        JNC    CHK
04190OVFL:   MVI    A,0FFH  ;OVERFLOW
04200CHK:    CPI    1EH     ;LIMIT < 15%?
04210        JNC    PL1     ;NO
04220        MVI    A,1EH   ;TRAP AT 15%
04230PL1:    MOV    B,A
04240        LDA    ?PHA2
04250        SUB    B       ;PHA-2 > LIMIT?
04260        JNC    PL2     ;YES
04270PL5:    MVI    H,0FFH
04280        STA    ?TEL10  ;SET TEL10 TO FFH
```

-continued

```
04290        LDA    ?TLRF
04300        ANI    0FBH    ;RESET TLRF BIT D2
04310        STA    ?TLRH
04320        LDA    ?TB
04330        CPI    0B0H    ;?TB < 800 MSEC?
04340        JC     PL6     ;YES
04350        LDA    ?MODE
04360        ANI    0EFH    ;RESET MODE BIT D4
04370        STA    ?MODE
04380PL6:   POP    D
04390        POP    B
04400        RET
04410
04420PL2:   CPI    14H     ;PHA2-LIM > 10%?
04430        JNC    PL7     ;YES
04440        LDA    ?MODE
04450        ORI    10H     ;SET MODE BIT D4
04460        STA    ?MODE
04470PL3:   XRA    A
04480        STA    ?TEL10  ;SET TEL10 TO 00H
04490        STA    ?TB     ;RESET TIMER TB
04500        LDA    ?TLRF
04510        ORI    04H     ;SET TLRF BIT D2
04520        STA    ?TLRF
04530        POP    D
04540        POP    B
04550        RET
04560
04570PL4:   MVI    A,0FFH
04580        STA    ?TEL10  ;SET TEL10 TO FFH
04590        LDA    ?TLRF
04600        ANI    0FBH    ;RESET TLRF BIT D2
04610        STA    ?TLRF
04620        LDA    ?MODE
04630        ANI    0EFH    ;RESET MODE BIT D4
04640        STA    ?MODE
04650        RET
04660
04670PL7:   LDA    ?MODE
04680        ANI    0EFH    ;CLEAR MODE BIT D4
04690        STA    ?MODE
04700        XRA    A
04710        STA    ?TEL10  ;ZERO TEL10
04720        STA    ?TB     ;RESET TIMER
04730        LDA    ?TLRF
04740        ORI    04H     ;SET TLRF BIT D2
04750        STA    ?TLRF
04760        POP    D
04770        POP    B
04780        RET
04790
04800
```

```
01920; ####################################
01930
01940TER:   MVI    A,30H
01950        OUT    2DH
01960        LDA    ?IR
01970        MOV    B,A
01980        LDA    ?IM
01990        ADI    10H     ;IM + 63 AMPS
02000        JNC    TER7
02010        MVI    A,0FFH  ;TRAP FOR OVERFLOW
02020TER7:  CMP    B       ;IM + 63 A < IR
02030        JC     TER0    ;YES
02040        LXI    H,?AP
02050        LDA    ?MODE
02060        MOV    B,A
02070        ANI    08H
02080        JNZ    TER0    ;MODE IS UNCONFIRMED
02090        MOV    A,B
02100        ANI    04H
02110        JZ     TEBK    ;BRAKE REQUEST
02120
02130        ;POWER REQUEST
02140
02150        LDA    ?FLG8
02160        ANA    A       ;COAST FLAG SET?
02170        JNZ    TER0    ;YES
```

-continued

```
0218Ø      MOV    A,M         ;GET P-SIG
0219Ø      CPI    82H
022ØØ      JC     TERØ        ;P SIG < 65 MA
0221Ø      SUI    82H         ;PI=AP-65MA
0222Ø
0223Ø      ;MAX LIMIT
0224Ø
0225ØTERM- CPI    46H
L:
0226Ø      JC     TER1        ;PI < 35 MA
0227Ø      MVI    A,46H       ;SET P1 TO 35 MA
0228Ø      ;TER SCALING ON PWR OR BPK
0229Ø
023ØØTER1: MOV    C,A         ;C = PI
0231Ø      MOV    A,B         ;GET MODE
0232Ø      ANI    Ø1H
0233Ø      JNZ    TER5        ;POWER MODE
0234Ø;BRAKE MODE
0235Ø      MOV    A,C
0236Ø      RRC
0237Ø      ANI    7FH
0238Ø      MOV    B,H         ;B = Ø. 5(P1)
0239Ø      RRC
024ØØ      ANI    3FH         ;H = Ø. 25(P1)
0241Ø      ADD    B
0242Ø      ADD    C
0243Ø      ADD    C
0244Ø      MOV    C,A         ;P2 = 2. 75(P1)
0245Ø      JMP    TER2
0246Ø
0247ØTER5: MOV    A,C
0248Ø      ADD    C
0249Ø      ADD    C
025ØØ      MOV    C,A         ;P2 = 3(P1)
0251Ø
0252Ø      ;APPLY LIMITS TO TER
0253Ø
0254ØTER2: MOV    A,C
0255Ø      STA    ?TER1
0256Ø      LXI    H,?TEL1
0257Ø      CMP    M           ;TER > TEL1?
0258Ø      JC     TER3        ;NO
0259Ø      MOV    A,M         ;TER=TEL1
026ØØTER3: INR    L
0261Ø      CMP    M           ;TER > TEL3
0262Ø      JC     TER4        ;NO
0263Ø      MOV    A,M         ;TER=TEL3
0264ØTER4: INR    L
0265Ø      CMP    M           ;TER > TEL7
0266Ø      JC     TER11       ;NO
0267Ø      MOV    A,M         ;TER=TEL7
0268ØTER11: INR   L
0269Ø      CMP    M           ;TER > TEL9?
027ØØ      JC     TER6        ;NO
0271Ø      MOV    A,M         ;TER=TEL9
0272ØTER6: INR    L
0273Ø      CMP    M           ;TER > TEL1Ø?
0274Ø      JC     TER12       ;NO
0275Ø      MOV    A,M         ;TER=TEL1Ø
0276ØTER12: INR   L
0277Ø      CMP    M           ;TER > TEL11?
0278Ø      JC     TER8        ;NO
0279Ø      MOV    A,M         ;TER=TEL11
028ØØTER8: INR    L
0281Ø      CMP    M           ;TER > TEL12?
0282Ø      JC     TER9        ;NO
0283Ø      MOV    A,M         ;TER=TEL12
0284ØTER9: INR    L
0285Ø      CMP    M           ;TER > TEL13
0286Ø      JC     TER1Ø       ;NO
0287Ø      MOV    A,M         ;TER=TEL13
0288ØTER1Ø: STA   ?TER
0289Ø      RET
029ØØ
0291Ø      ;BRAKE REQUEST
0292Ø
0293ØTEBK:  MOV    A,M         ;GET P-SIG
0294Ø      CPI    6EH
0295Ø      JNC    TERØ        ;AP > 55 MA
0296Ø      MOV    B,A
0297Ø      MVI    A,6EH
0298Ø      SUB    E           ;P1=55 MA-AH
0299Ø      JMP    TERML
03ØØØ
03Ø1Ø      ;SET REQUEST TO ZERO
03Ø2Ø
03Ø3ØTERØ: XRA    A
03Ø4Ø      STA    ?TER
03Ø5Ø      STA    ?TER1
03Ø6Ø      RET
03Ø7Ø
```

What we claim is:

1. In motor control apparatus operative with a power supply voltage including a chopper having a phase angle of operation and coupled with a vehicle propulsion motor having a first motor operation curve determined by said power supply voltage, said vehicle having a control device providing an effort request signal with a range of values and determining the desired movement of the vehicle, the combination of means responsive to said effort request signal for determining a desired acceleration rate for said vehicle, means responsive to said effort request signal within said range for establishing a phase angle limit for the chopper in accordance with a predetermined relationship to said effort request signal, means responsive to the phase angle limit for establishing a voltage limit for said motor, and control means coupled with said chopper and responsive to the effort request signal and the established motor voltage limit for providing for said motor a second motor operation curve for determining the desired movement of said vehicle.

2. The motor control apparatus of claim 1, with said phase angle limit establishing means providing a constant minimum value for the phase angle limit of said chopper in relation to a first portion of said range of said effort request signal.

3. The motor control apparatus of claim 1, with said phase angle limit establishing means providing a predetermined constant value minimum relationship for said phase angle limit in accordance with a first portion of said range of said effort request signal values and providing a predetermined linear change relationship for said phase angle limit in accordance with a second portion of said range of said effort request signal values.

4. The motor control apparatus of claim 1, with said motor voltage limit being operative after the first motor operation curve is reached for determining the maximum speed of the motor as established by said phase angle limit.

5. The method of controlling a motor coupled with a chopper responsive to an input effort request signal having a range of values for establishing the desired operation of said motor, said motor being operative with a power supply voltage establishing a first motor operaton curve, including the steps of determining the acceleration rate of said motor in response to said effort request signal before the first motor operation curve is reached, determining a phase angle for said chopper in response to the effort request signal, with said phase angle having a limit relationship over at least a portion of said range of values, determining a voltage limit for said motor in accordance with the limit relationship of the phase angle, determining a second motor operation curve different than the first motor operation curve for said motor in accordance with said voltage limit, and providing said desired operation of the motor in accordance with said input effort request signal and said second motor operation curve.

6. The method of claim 5, with said second motor operation curve being determined in relation to a predetermined phase angle limit established for said chopper as a function of each value of said effort request signal.

7. The method of claim 5, with said motor voltage limit having a substantially linear relationship with the respective values of said effort request signal over said portion of the range of values.

* * * * *